(12) United States Patent
White (10) Patent No.: US 7,305,234 B1
(45) Date of Patent: *Dec. 4, 2007

(54) AUTOMATED DEVICE BEHAVIOR MANAGEMENT BASED ON PRESET PREFERENCES

(75) Inventor: Christopher White, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 23 days.

This patent is subject to a terminal disclaimer.

(21) Appl. No.: 11/190,488

(22) Filed: Jul. 26, 2005

Related U.S. Application Data (63) Continuation of application No. 10/324,159, filed on Dec. 19, 2002, now Pat. No. 6,941,134.

(51) Int. Cl.
  H04Q 7/22 (2006.01)
  H04M 15/00 (2006.01)
  H04M 11/00 (2006.01)
(52) U.S. Cl. ............. 455/418; 455/407; 455/408; 455/414.1; 455/419; 379/114.06; 379/130
(58) Field of Classification Search ........ 455/407–408, 455/414.1, 418–419; 379/114.01, 114.03, 379/114.06, 130
See application file for complete search history.

(56) References Cited

U.S. PATENT DOCUMENTS

| | | | |
|---|---|---|---|
| 5,794,140 A * | 8/1998 | Sawyer ..................... 455/408 |
| 5,799,072 A | 8/1998 | Vulcan et al. |
| 5,970,403 A | 10/1999 | Alperovich et al. |
| 5,974,308 A * | 10/1999 | Vedel ...................... 455/407 |
| 6,026,291 A * | 2/2000 | Carlsson et al. ............ 455/406 |
| 6,032,038 A * | 2/2000 | Schroderus et al. ........ 455/405 |
| 6,049,712 A * | 4/2000 | Wallinder ................. 455/410 |
| 6,091,944 A * | 7/2000 | Friend ...................... 455/409 |
| 6,208,719 B1 | 3/2001 | Lo et al. |
| 6,246,756 B1 * | 6/2001 | Borland et al. ......... 379/142.01 |
| 6,532,284 B2 | 3/2003 | Walker et al. |
| 6,564,047 B1 * | 5/2003 | Steele et al. .............. 455/405 |
| 6,577,717 B1 | 6/2003 | Henon |
| 6,622,017 B1 * | 9/2003 | Hoffman ................... 455/419 |
| 6,782,253 B1 | 8/2004 | Shteyn et al. |
| 6,941,134 B2 | 9/2005 | White |
| 2002/0045441 A1 | 4/2002 | Ralston et al. |
| 2002/0107000 A1 | 8/2002 | Goss et al. |
| 2002/0183051 A1 | 12/2002 | Poor et al. |
| 2004/0043763 A1 * | 3/2004 | Minear et al. ............ 455/419 |
| 2004/0123147 A1 | 6/2004 | White |
| 2004/0132438 A1 | 7/2004 | White |
| 2004/0132449 A1 | 7/2004 | Kowarsch |
| 2004/0142682 A1 | 7/2004 | Kamiya et al. |
| 2004/0203584 A1 | 10/2004 | White |
| 2004/0203955 A1 | 10/2004 | White |

OTHER PUBLICATIONS

Nokia 8260 User Guide, © 2000, 5 pp., Nokia Mobile Phones, Inc., Tampa FL.

* cited by examiner

*Primary Examiner*—Binh K. Tieu
(74) *Attorney, Agent, or Firm*—Woodcock Washburn LLP (57) ABSTRACT

A system and method for automated management of the behavior of a wireless communication device is disclosed herein. Behavior preference settings are configured and provided to a wireless network and the wireless communication device. The wireless network provides current conditions or events to the wireless communication device. The wireless communication device enforces the preference settings based on current conditions and counters for incoming and outgoing communications to a third party.

15 Claims, 9 Drawing Sheets

Specify overall preferences:

1. Number of minutes allotted to outgoing calls _______
2. Number of minutes allotted to incoming calls _______
3. Number of text messages out _______
4. Number of text messages in _______
5. Bucket may be exceeded (y/n) _______
   ⋮

*FIG. 3*

Specify preferences for phone number XXX-XXX-XXXX:

1. Calls to go out (y/n) _______
2. Calls to come in (y/n) _______
3. Number of minutes allotted to outgoing calls _______
4. Number of minutes allotted to incoming calls _______
5. Outgoing text messages (y/n) _______
6. Incoming text messages (y/n) _______
7. Number of outgoing text messages _______
8. Number of incoming text messages _______
9. Bucket of allotted minutes to be exceeded (y/n) _______
   ⋮

AUTOMATED DEVICE BEHAVIOR MANAGEMENT BASED ON PRESET PREFERENCES

CROSS-REFERENCE TO RELATED APPLICATION(S)

This is a continuation application of U.S. application Ser. No. 10/324,159, filed Dec. 19, 2002, now U.S. Pat. No. 6,941,134, issued Sep. 6, 2005, which is related to U.S. application Ser. No. 10/324,494, filed Dec. 19, 2002 entitled "Conditional Application Invocation in a Wireless Device" by Christopher White; U.S. application Ser. No. 10/324,354, filed Dec. 19, 2002 entitled "Automated Device Behavior Management Based on Network Charging and Rating Conditions" by Christopher White; and U.S. application Ser. No. 10/324,870, filed Dec. 19, 2002 entitled "Control of Security or Ease-of-use Sensitivity for a Wireless Communication Device" by Christopher White.

BACKGROUND

Users of wireless communication devices agree on rating and charging terms in a service provider agreement. The network service provider, or carrier, typically offers a variety of plans with different variables. The variables include the amount of air time per billing cycle that is charged at a minimum rate, more favorable rates during "off-peak" times such as nights and weekends (as opposed to "on-peak" or "peak") times, different rates for on-network use and roaming use, fees for special services such as call conferencing and email usage, etc. The amount of time available per billing cycle at a certain rate is sometimes referred to as the amount of time in a bucket. For example, the user typically chooses a number of minutes per month, e.g., 300 minutes per month, that are free or charged at a minimal rate. After the 300-bucket minutes are used, airtime is charged or charged at a higher rate.

Users benefit from having an awareness of how much money they will spend if they use their device at a certain time or in a certain way. For example, the user might like to know that only five minutes are left in the bucket. This rating and charging awareness is even more important with data connections than with voice connections. For example, sending or receiving email during peak hours may be more expensive than during off-peak hours. For the user to adjust device usage based on rating and charging conditions, however, the user currently must affirmatively find out what the conditions are and act or refrain from acting accordingly.

Moreover, as the usage of wireless communication devices proliferate to the extent that employers are providing such devices to employees and parents are providing such devices to their children, whether the devices are being solely used for their intended purpose (e.g., to conduct business or for emergencies) becomes an issue. Although it is possible to review a bill itemizing device usage, improper usage, if any, would have already occurred and would have to be paid for. Reviewing potentially thousands of bills would also be cumbersome.

Currently, the ability to automatically manage device use is very limited, costly, and awkward. For example, if a user wishes for an action to be taken based on a condition, such as having particular phone numbers disabled under certain conditions, it would be handled on an occurance-by-occurance basis at the provider site. The provider must program a local provider application to recognize that the device belonging to the particular account is making a particular call when a specified condition is current. The provider must then invoke a native application on the device, such as the call controller, to disable the specified phone numbers. This has several limitations and disadvantages. The user must make a written or verbal request to the provider. The provider must assign someone to program the provider application, and activities of the affected device must be monitored, which slows call handling. The provider can only invoke native applications, not downloaded applications, which limits the actions that can be taken in response to a condition. Various other problems exist.

In the drawings, identical reference numbers identify identical or substantially similar elements or acts. To easily identify the discussion of any particular element or act, the most significant digit or digits in a reference number refer to the figure number in which that element is first introduced (e.g., element 704 is first introduced and discussed with respect to FIG. 7).

The headings provided herein are for convenience only and do not necessarily affect the scope or meaning of the claimed invention.

DETAILED DESCRIPTION

Described in detail below is a system and method for providing automated management of the behavior of a wireless communication device based on preset preferences or controls. In one embodiment, authorized persons (e.g., parents or employers) set preferences or controls specifying the actions or inactions that a wireless communication device (or an account associated with one or more wireless communication devices) will be constrained to. The specified preferences reside at the service provider's network to the extent required to download such preferences to the wireless communication device(s) and to communicate new or changed conditions or events (e.g., start of off-peak hours, new month with a replenished bucket of minutes, etc.) to the device(s). The wireless communication device enforces the specified preferences in accordance with current conditions. The preferences can be readily modified in real-time with minimal additional resources on the wireless service network or service provider.

Accordingly, parents can set a wireless communication device used by their child to, for example, only allow certain phone numbers to be picked up or dialed out, a certain number of minutes of airtime per month, or a certain number of minutes of airtime per month with a friend but unlimited minutes of airtime with parents or emergency numbers. Similarly, an employer can set one or more devices used by employees to, for example, only allow calls in a sales territory, calls during standard business hours, or calls to other members of a sales team.

The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of embodiments of the invention.

Figure 1:
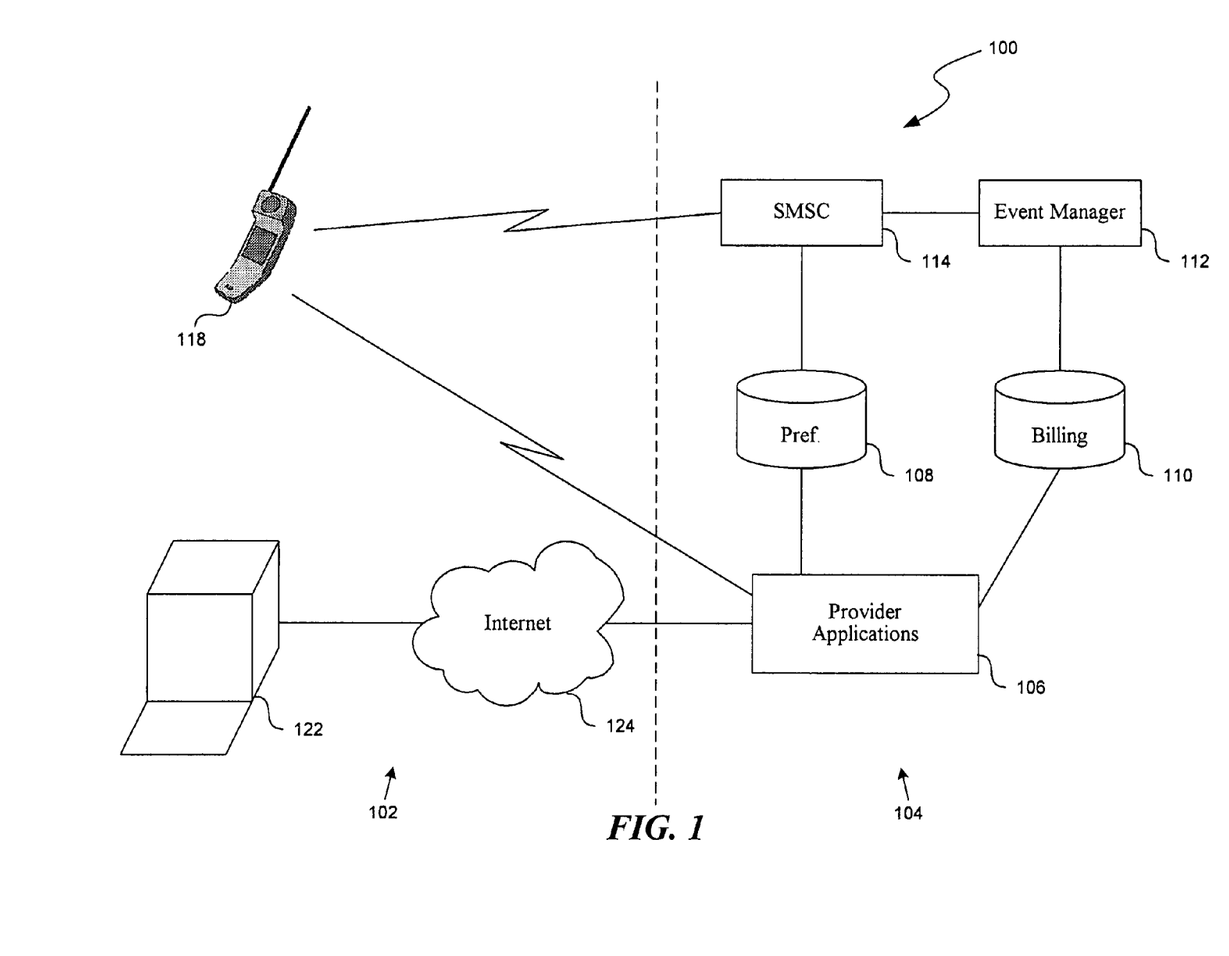
FIG. 1 is a block diagram illustrating one embodiment of a wireless communication system.

Referring to FIG. 1, one embodiment of a wireless communication system 100 is shown. The system 100 is arbitrarily divided into an area 102 and an area 104. The area 102 includes equipment and applications that are typically not provided or maintained by a wireless communication service provider, such as a cellular voice and data service provider, but which are designed to communicate on the wireless network with the provider equipment. The area 104 includes equipment and applications typically provided and maintained by the service provider. The system 100 is one example of an arrangement of elements, but others are possible. A cellular phone service provider is one example of a provider, but other examples include any wireless service provider that provides wireless communication capabilities through a user device over a wireless network. For example, service providers that support handhelds and wireless modems are also providers for purposes of the embodiments described.

In the area 102, each of a wireless communication device 118 and a computer or workstation 122 (via the Internet 124) is configured for communicating on the wireless network. An authorized person (e.g., one or more persons having a password or authority to set or modify the preferences or controls) may configure the preferences by accessing a dedicated provider configuration application included in provider applications 106. The applications 106 may be accessed using the device 118 or the computer 122.

In the area 104, various computers, data processors, and telecommunication equipment (e.g., base stations and switching centers) known to be part of the provider equipment are not shown. Provider applications 106 include software, firmware, and/or hardware for maintaining and administering the wireless network. For example, the applications 106 include billing applications, performance monitoring applications, and the like. The applications 106 further include tools that track user accounts, which are typically designated by a responsible billing party. The account may include one user with one device, or a group of many users each with a respective device. For example, some enterprises provide groups of employees with devices for limited or unlimited use in the course of employment.

The area 104 further includes databases 108 and 110 coupled to the applications 106. The databases 108, 110 are shown separately to distinguish the types of data stored, but could be one or more physical entities. The database 108 is configured to be a preference database that stores the specified preferences dictating the behavior of each given device. The database 108 is further configured to store the conditions or events associated with the specified preferences that the device is to be automatically notified of. The specified preferences for a given device stored in the database 108 may be deleted or reformatted once the specified preferences have been downloaded to the device. The database 110 is a billing database that stores data used by the service provider to generate bills for an account. Billing data includes all of the information in a user's rate plan, such as the number of minutes in a bucket, bucket rates, out of bucket rates, etc.

A short message service controller (SMSC) 114, coupled to the database 108, is configured to manage short messaging, including receiving/sending, generating, and encoding/decoding short message service (SMS) messages. An event manager 112, coupled to the SMSC 114 and the database 110, is configured to recognize events that indicate a change in the current condition (e.g., change from off-peak to peak time) and in response communicates such recognition to the SMSC. Each of the SMSC 114 and the event manager 112 can be dedicated firmware, hardware, and/or software embodied in a processor or computing apparatus. Although the SMSC 114 and the event manager 112 are shown as separate devices, they may be embodied in as a single device. Further, while SMS messages are described, other visual or audible messaging systems and formats may be used.

The device 118 includes one or more native applications and downloaded applications. The native applications are configured to permit the device 118 to perform typical voice and/or data wireless communications such as place calls, receive calls, scan for control channels, etc. The downloaded applications may come from the service provider or a third party vendor. Downloaded applications are configured to permit the device 118 to perform additional functions such as managing emails or automatic management of device behavior. As such, downloaded applications provide further functionality and selective manipulation of the basic voice or data communications on the wireless network. The service provider need not have knowledge of the downloaded applications or configuration of the downloaded applications at the device 118.

The specified preferences, as described in detail below, are applicable at an account level (e.g., multiple devices associated with an account) or device level (e.g., one device among several devices associated with an account). Based on an agreed-upon service or rate plan and specified preferences, the device 118 and the components in the area 104 communicate transparently with each other to monitor current conditions and dictate which applications are to be automatically executed at particular times on the device 118. The service provider forwards such conditions to the device 118 for processing. The service provider does not need to intercept, monitor, or specifically process calls in order to affect device behavior.

Figure 2:
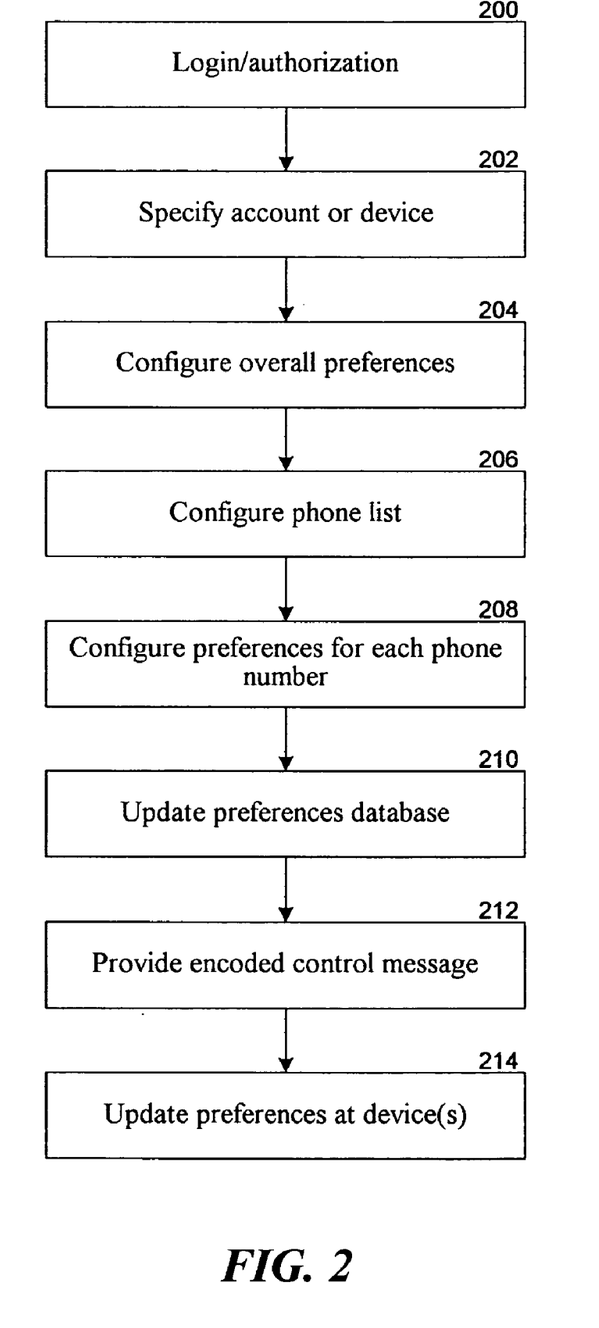
FIG. 2 is a flow diagram illustrating one embodiment for setting preferences in the system of FIG. 1.

In FIG. 2, a flow diagram for setting the preferences is shown. At a block 200, an authorized person (e.g., a parent, employer, or person responsible for the account) logs into an interface for setting the preferences using the computer 122, the device 118, or a variety of other devices (not shown). A password or other security feature may also be required since the person configuring the preferences for device behavior will typically not be the same person using the device 118. For example, the computer 122 can access a website provided by the service provider, via the Internet 124, to remotely configure the preference settings.

At a block 202, the authorized person indicates the account or device(s) for which the preferences will be specified. Alternatively, this block is optional if the account or device(s) is automatically known based on the login information. Then at blocks 204-208, the authorized person configures the behavior preferences or controls of the device 118. In one embodiment, a graphical user interface (GUI) is provided for preference configuration.

Figure 3:
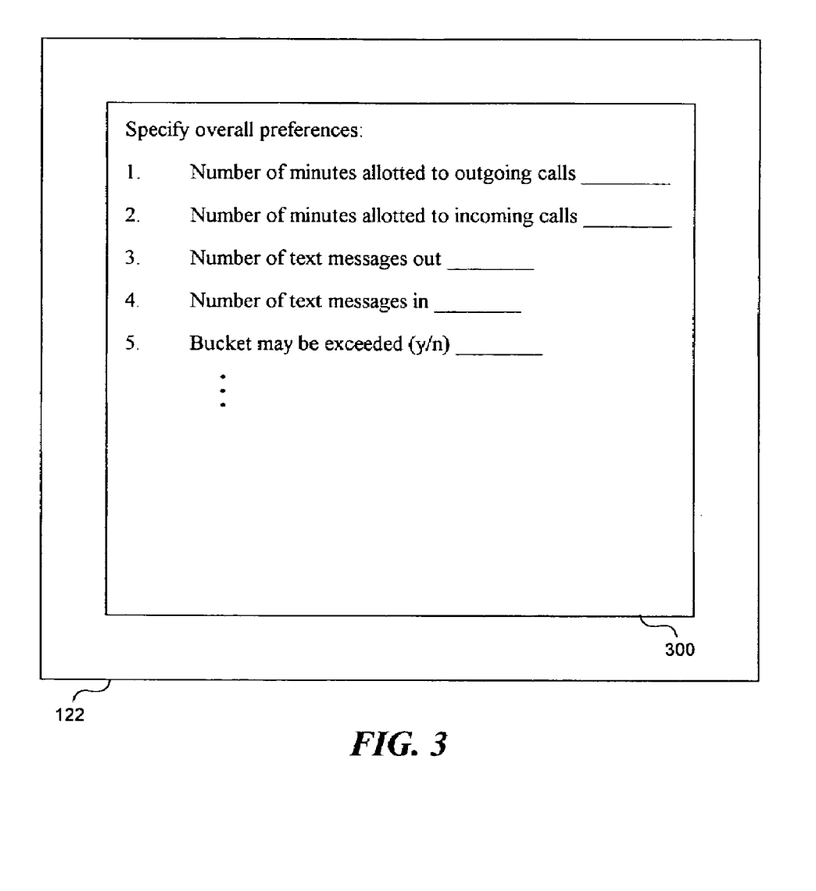
FIG. 3 is an illustration of a graphical user interface used for setting preferences in FIG. 2.

At the block 204, overall or macro level preferences for the device 118 are configured. Overall or macro level preferences involve controls that are not associated with a particular incoming or outgoing phone number (or email or website address in the case of data communication), but with the actions or inactions generally governing the device 118. Overall preferences can include the total bucket of allotted minutes per billing cycle, whether any calls can be made during on-peak hours, whether calls that are blocked get routed to voicemail or a log for later review, etc. In FIG. 3, an illustration of an overall preference configuration screen 300 on the computer 122 is shown. In another embodiment, the block 204 may be optional depending on the configuration block 208.

At the block 206, a list of approved or banned phone numbers (whichever would be the shorter list) is configured. The list specifies the numbers that the device 118 can dial out and pick up. Alternatively, the list may specify recognized sources or locations that are approved. Similar lists can be configured for text messages, email addresses, HTTP addresses, etc. The list, also referred to as a list of origination or termination addresses, may be subscriber identifiers, communication network addresses, or mobile device identifiers. The mobile device identifiers may be an Electronic Serial Number (ESN), Mobile Station Identifier (MSID), or International Mobile Equipment Identifier (IMEI). The communication network addresses may be a mobile station ISDN (MSISDN) number or an Internet Protocol (IP) address. The subscriber identifiers may be telephone numbers, International Mobile Subscriber Identity (IMSI), Mobile Identity Number (MIN), or Internet access subscriber account identifier.

Figure 4:
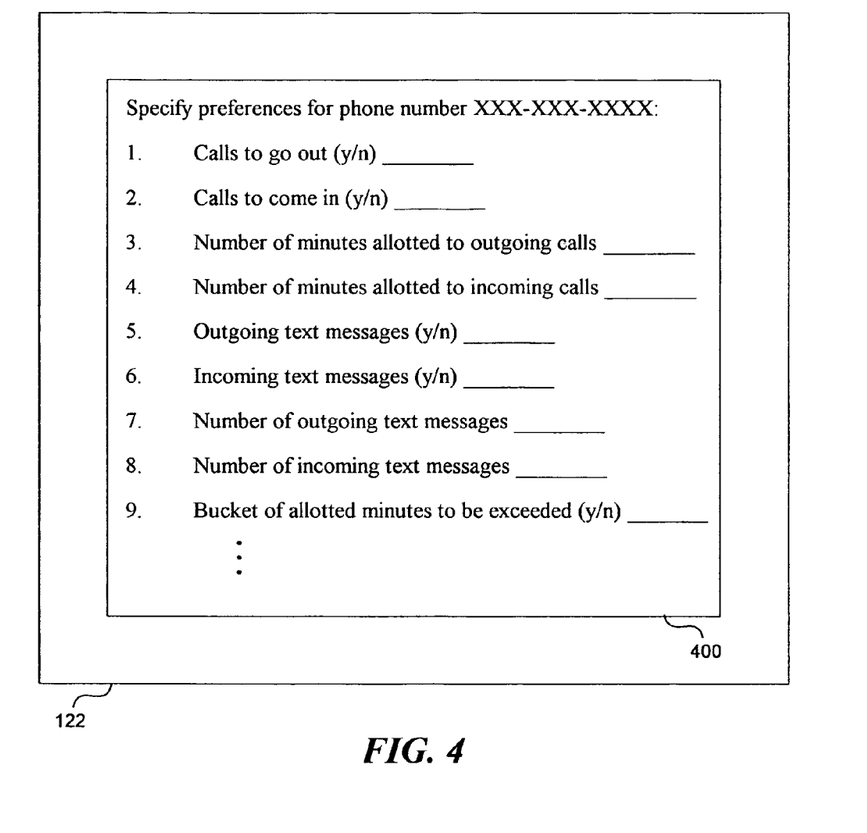
FIG. 4 is an illustration of another graphical user interface used for setting preferences in FIG. 2.

At the block 208, preferences associated with each of the phone numbers from the block 206 are configured. Also referred to as the phone book level preferences, micro (or granular) level control of the device behavior relating to each of the approved list phone numbers is specified. In FIG. 4, a GUI screen 400 on the computer 122 shows a plurality of preferences that can be set for a given phone number. The system 100 is configured to provide one or more sets of phone book level preferences (e.g., the GUI screen 400), a complete list of phone book level preferences from which the authorized person can select from, and/or a variety of other formats from which the authorized person can configure the preference settings for each of the approved phone numbers. Moreover, the type of phone book level preferences can be different among the phone numbers. For example, a first phone number may be set with outgoing call restrictions but no incoming call restrictions, while a second phone number may be set with incoming call restrictions only.

Once the authorized person has specified all the device behavior preferences, the preferences are stored at the database 108 (block 210). Alternatively, the preferences are stored in real-time at the database 108 as the configuration is in progress. When the new or updated preferences are provided at the provider equipment (e.g., the database 108), the SMSC 114 generates an encoded SMS message to the device 118. At a block 212, the encoded SMS message transmitted to the device 118 indicates that new or updated preferences are available for download. The encoded message can be a general packet radio service (GPRS) signal or include a "Home GPRS available" condition in the signal.

In response, at a block 214, the device 118 opens a communication channel to the provider equipment to retrieve the new preferences. The device 118 invokes a Java application management service (JAMS) that looks for applications with a "Refresh when new data connection becomes available" flag set. Such applications accordingly start and perform preference data refresh.

For purposes of the device 118 configuration, out-of-band signals are exchanged between the device and the provider equipment. These signals may be exchanged via a hypertext transfer protocol (HTTP) connection, a wireless application protocol (WAP) connection, or any other wireless communication method (including in-band signals). The process illustrated in FIG. 2 is repeated each time new preferences are set for an account or device, or when preferences are updated.

Figure 5:
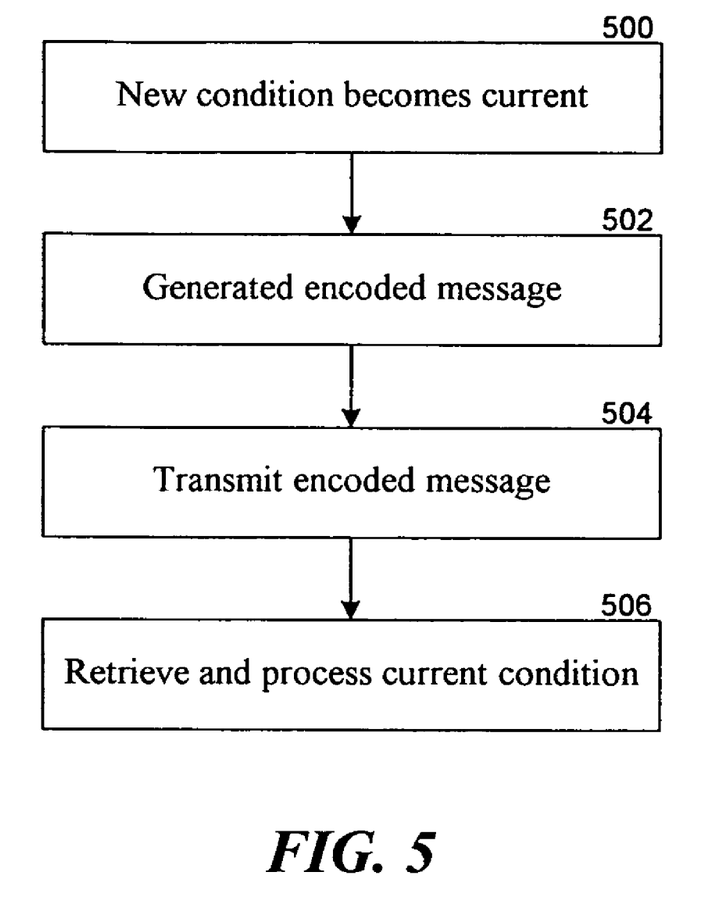
FIG. 5 is a flow diagram illustrating one embodiment for sending condition messages in the system of FIG. 1.

Referring to FIG. 5, a flow diagram illustrates new condition or event notification to the device 118. The event manager 112 is configured to monitor and recognize when a new condition or event relevant to the device 118 becomes current (block 500). Conditions or events include, among others, a peak rate being current, an off-peak rate being current, a minute bucket being empty, whether the device 118 is currently roaming for services, whether the device is currently on the network, and a start of a new billing period. For example, the database 110 sends a message to the event manager 112 indicating that the bucket is empty.

At a block 502, the event manager 112 requests the SMSC 114 to generate an encoded message regarding the current condition. At a block 504, the SMSC 114 communicates the encoded message to the device 118.

At a block 506, the device 118 receives and decodes the encoded message. If the current condition data is not included in the encoded message, the device 118 sends a return message to retrieve the current condition data from the event manager 112. The current condition data is processed by the device 118 to produce device behavior in accordance with the configured preferences. The notification process illustrated in FIG. 5 is repeated each time a current condition is reported to the device 118.

Figure 6:
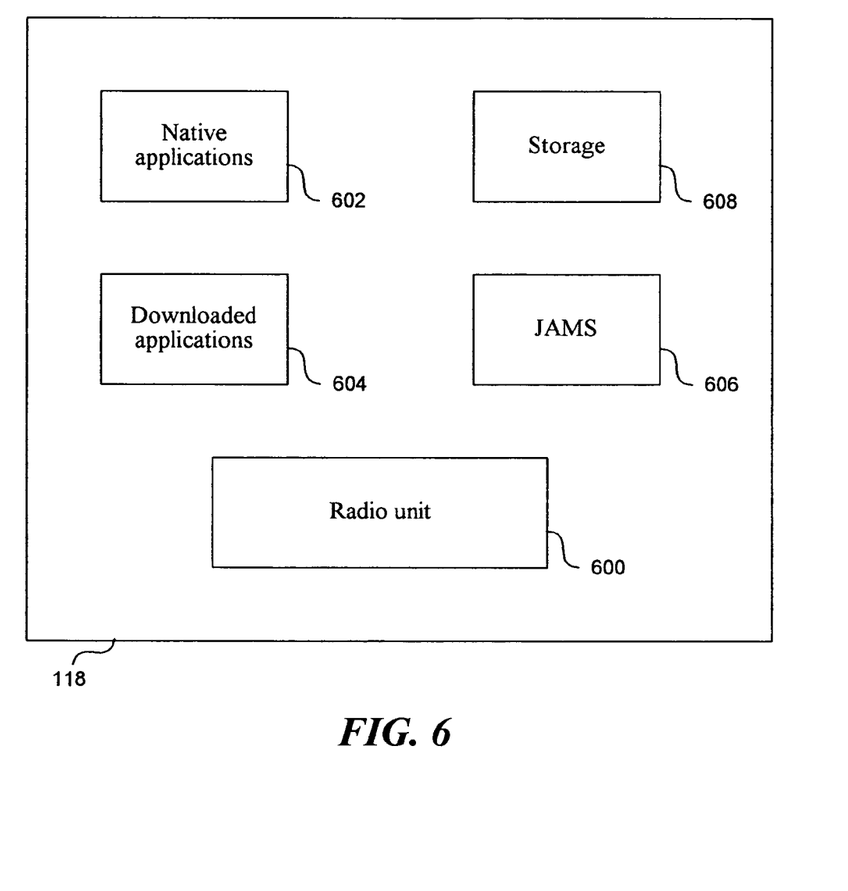
FIG. 6 is a block diagram of an embodiment of a wireless communication device.

Shown in FIG. 6 is a block diagram of one embodiment of the device 118. The device 118 includes a radio unit 600 configured to provide communication over the wireless network. The radio unit 600 includes hardware, firmware, and/or software such as a transceiver, antenna, and signal-processing chip. The device 118 further includes native applications 602 and downloaded applications 604 as discussed herein. A JAMS 606 includes Java programs and Java program management capability. A storage or database 608, e.g., a non-volatile memory or SEM, is configured to store at least a portion of the preference configurations. Many other known elements of the device 118, such as on-board processors, are not shown.

Figure 7:
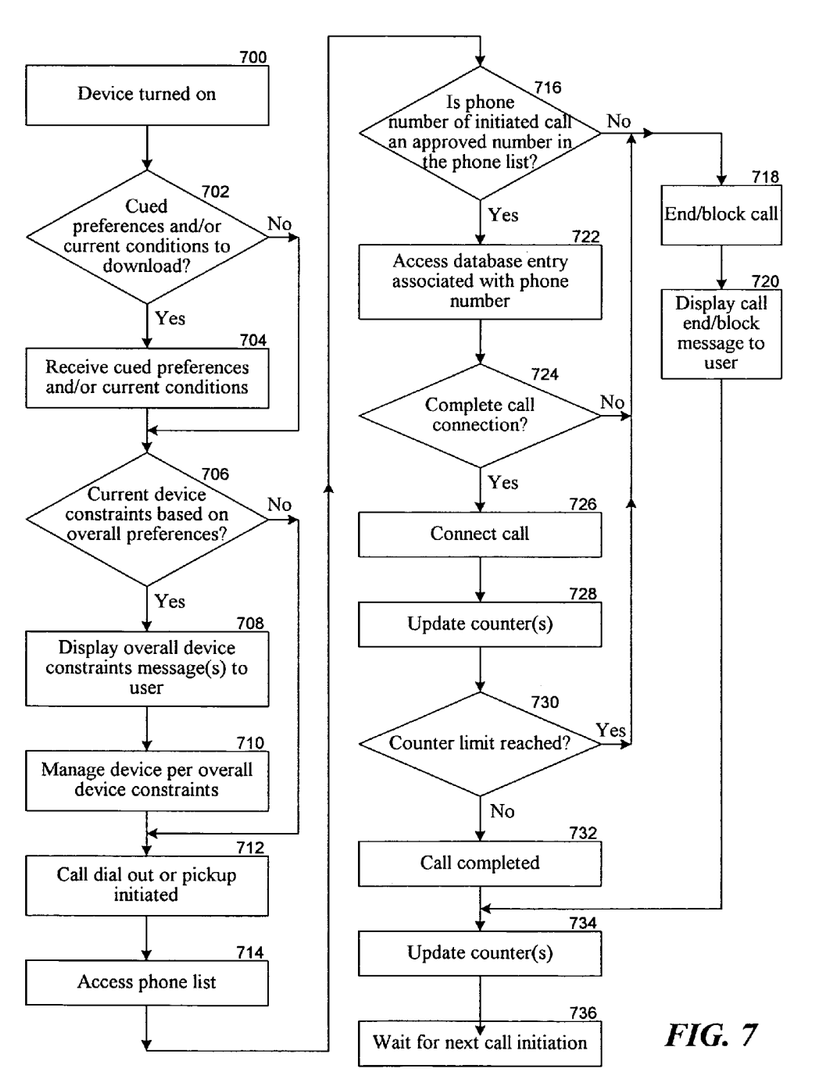
FIG. 7 is a flow diagram illustrating one embodiment of the automated behavior management at the wireless communication device of FIG. 6.
Figure 8:
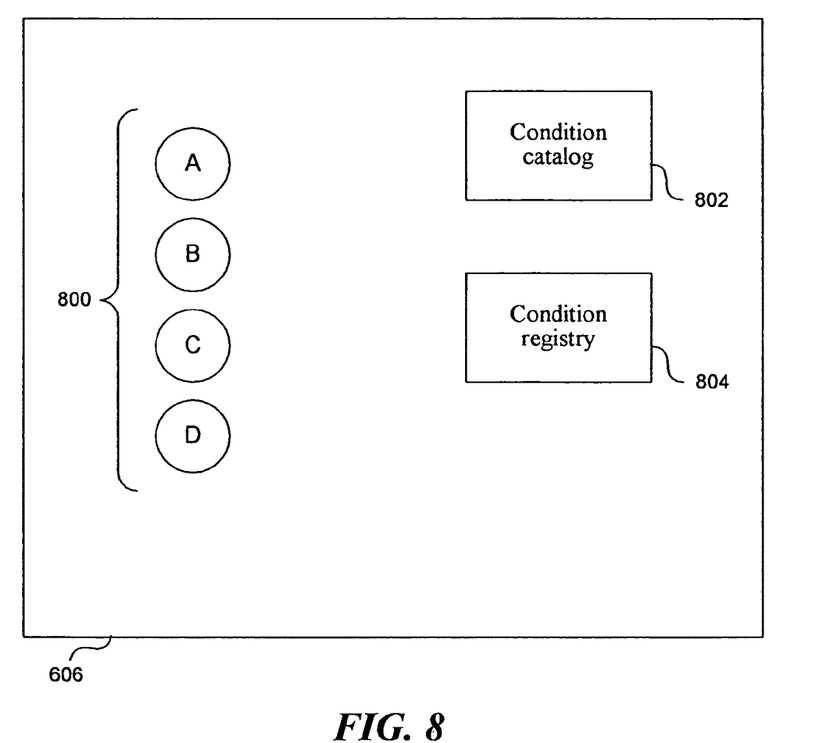
FIG. 8 is a block diagram of an embodiment of a Java application management service (JAMS).

Several functions are performed by the device 118 in order to behave per the present preferences since neither the preference configurations nor the current conditions can be downloaded to the device 118 when it is powered down, a current condition can occur at any time, and the preference configurations can be at the granular level (i.e., approved list of phone numbers with controls established for each of these phone numbers). At a block 700 in FIG. 7, the device 118 is turned on. Updated preference settings and/or current conditions may be waiting at the provider equipment to be downloaded to the device 118. If there are cued downloads (block 702), then the device 118 receives and processes such downloads at a block 704 as discussed with respect to FIGS. 2 and 5. If there are no cued downloads, then application of the behavior preference settings can begin at a block 706. In one embodiment, automated management is coordinated by a downloaded application included in the downloaded applications 604 (FIG. 8).

At the block 706, a check is performed to see if there are any overall device preferences that may apply even absent any incoming/outgoing calls. If there are no constraints, e.g., incoming/outgoing calls can be attempted, then the application waits for a call to be initiated at a block 712. Otherwise, if at least one constraint exists, then one or more messages can be displayed on the device 118 (block 708) to inform the user of the device of such constraint(s). As an example, during off-peak hours, messages such as "No calls allowed during off-peak hours" or "Allotted amount of time for off-peak usage exceeded" may be displayed so that the user will know how the device will behave. And at a block 710, appropriate blocks or constraints are applied to the device 118 consistent with the applicable overall preference settings.

In one embodiment, the JAMS 606 manages device behavior with respect to the overall preference settings. As shown in the block diagrams of FIGS. 8 and 9, the JAMS 606 includes downloaded Java applications 800 designated A, B, C, and D. More or less than four downloaded Java applications can be provided, depending on storage capacity or types of applications required. The JAMS 606 also includes a condition catalog 802 and a condition registry 804.

Figure 9:
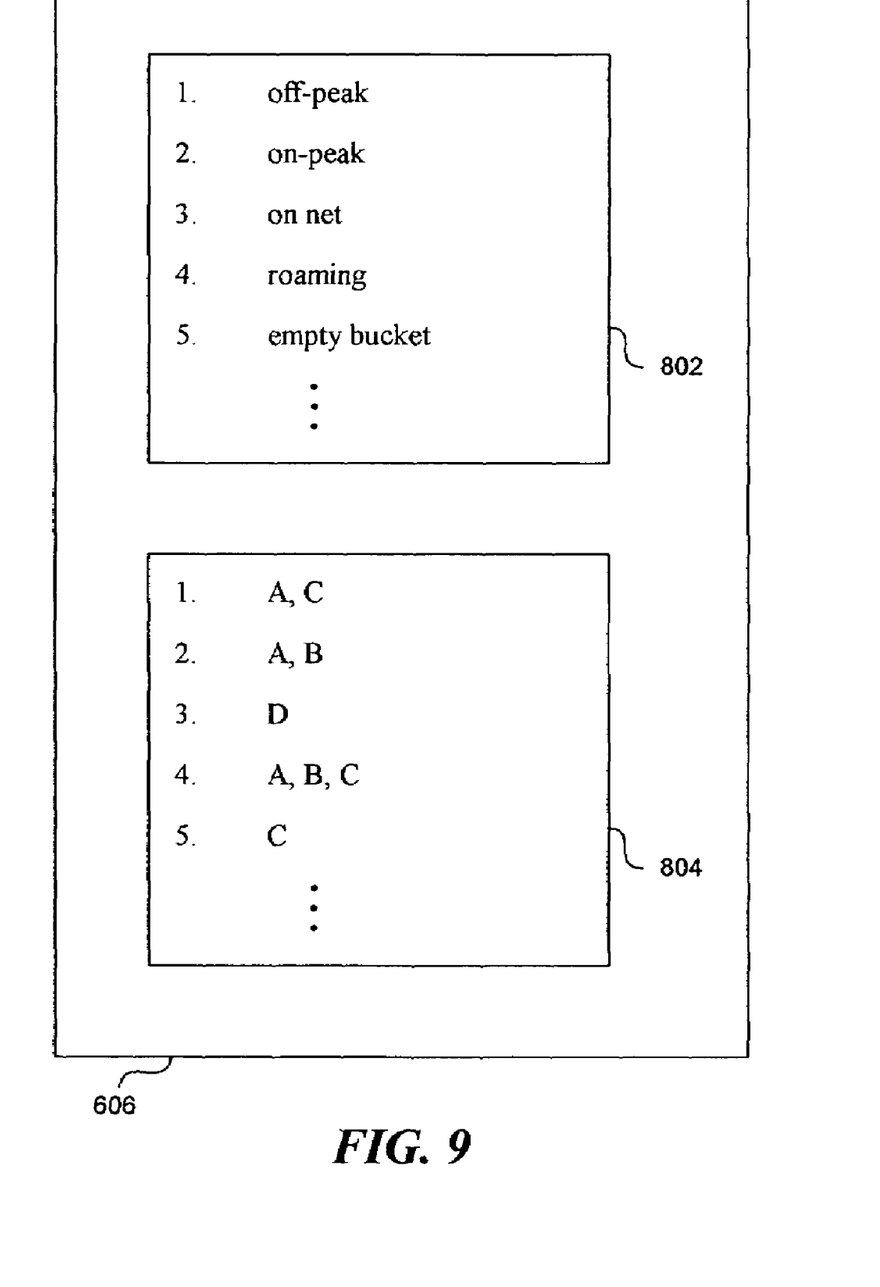
FIG. 9 is a diagram of a condition catalog and registry included in the device of FIG. 6.

The condition catalog 802 includes a list of conditions relevant to the device 118 in light of the downloaded preference settings. The condition catalog 802 is accordingly configured when new or updated preference settings are downloaded as previously described. The conditions shown in FIG. 9 are a subset of possible conditions that can be recognized by the device 118. Some examples of conditions are off-peak rate time, peak rate time, being on the network, roaming for service, and the bucket being empty.

The condition registry 804 is configured to identify which downloadable Java applications (A, B, C, and/or D) should be executed when a condition occurs. For example, when condition 2 occurs (peak rate time becomes current), applications A and B are executed. Application A may be an application that generates a display message that the transition from off-peak to peak rate is occurring, while application B may block outgoing calls automatically.

In other embodiments, the applications listed in the condition registry include native applications as well as downloaded applications. In still other embodiments, the condition catalog and registry 802 and 804 are included elsewhere in the device 118 (such as in the storage 608 or downloaded applications 604) instead of the JAMS 606.

Once overall preference settings have been expressed, the device 118 waits for an incoming or outgoing call. Assuming that the overall preference settings are not set to block all calls, a call (dial out or pick up) is initiated in a block 712. Before the call can be connected, a phone list of the approved or barred numbers (e.g., part of the downloaded preference settings) stored in the storage 608 is accessed at a block 714.

At a block 716, the phone number of the initiating call is compared against the phone list to see whether it is an approved phone number. If the initiating call is not an approved number, then the call is blocked and prevented from connecting (block 718). A message may also be displayed informing the user of the device 118 of the block and non-connection at a block 720. Otherwise, if the initiating call is on the approved phone list, then a database entry of the preference settings associated with that phone number is accessed at a block 722.

The database entry may be stored in the storage 608 and can contain, among others, data similar to that shown in FIG. 4. Depending on the preference settings contained in the database entry (block 724), the call will be connected (block 726) or blocked (blocks 718 and 720). As an example, if one of the preference settings for the phone number specifies the number of allotted minutes for that number, then if the maximum number of allotted minutes has already been reached during the current billing cycle, the call will not be allowed to go through.

In the case where the call is allowed to go through (i.e., block 726), then one or more counters may be updated at a block 728. The preference settings determine whether one or more counters are required. For example, based on the preference settings shown in FIG. 4, there would be a counter set up and maintained for each of settings 3, 4, 7, 8, and 9 for that particular phone number. In addition, there would also be a counter set up and maintained for each of settings 1-5 for the device overall if preference settings also included those shown in FIG. 3. The counters may be maintained in a processor (not shown) or the storage 608 included in the device 118.

At blocks 730-734, the call is allowed to continue until the user completes the call when all relevant counters' limits have not been exceeded. Otherwise, the call may be terminated and a termination message may be displayed on the device 118.

Upon call completion or termination, counter(s) may be updated again to reflect current device usage in a block 734. Then the device 118 waits for the next call initiation at a block 736.

Although not shown in FIG. 7, the device 118 can receive encoded messages pertaining to current conditions and updated preference settings from the provider equipment whenever it is powered on. Additional settings can be configured to address blocked calls. Incoming blocked calls can be automatically routed to an answering or voicemail service. Blocked calls can be logged for the authorized person to review. Moreover, the device 118 can be configured to check for current conditions or preference settings if, for example, a long time has lapsed since the last update.

Thus, a range of device behavior can be controlled based on a variety of criteria. Following are illustrations of device behavior that is possible with establishment of the preference configurations discussed herein. In a first illustration, a device may be set so that all calls are blocked unless specifically enabled. This setting could prevent unknown persons from contacting a child and control the child's access to certain people via the device. If a phone number is not recognized or is not on an approved phone list, the device will not pick up or dial out.

In a second illustration, members of a sales team could be limited to making calls only in their sales territory, during standard business hours, to other members of the team, or up to a certain number of allotted minutes per billing cycle. In a third illustration, a parent sets his son Billy's cellular phone to allow Billy to talk to his best friend Johnny for only 30 minutes a month or billing cycle. After the 30-minute bucket has been emptied, a call from Johnny will not be picked up nor will Billy be able to dial out to Johnny. When the 30-minute bucket resets, Billy will be able to talk to Johnny for another 30 minutes. Alternatively, if the parent sets a limit on phone usage as a whole, e.g., 60 minutes a month bucket, certain exceptions can be specified. An exception can be if Billy needs to call his parent, the call will always go through regardless of whether the bucket has been emptied. Call exceptions for certain numbers can be set, such as calls to or from home, parent's office, 911, 611, 311, and the like.

In a fourth illustration, the parent limits Billy's access to a certain number of minutes during the off-peak billing hours, except for emergencies or calls home. All other incoming or outgoing calls or text messages will not be allowed.

In a fifth illustration, to prevent scam artists from gaining access to Billy, Billy's access has been set to allow only a certain list of recognized and approved numbers. The list can be updated remotely by Billy's parents via a web site at any time. Additionally, unapproved calls are routed to an "approving authority" before the call can be connected. So if great-aunt Edna calls Billy, Billy's parent would get an automated option to approve or deny the call on Billy's device.

In a sixth illustration, a company wishes to allow certain Java based reference applications (e.g., market comparison databases) to be downloaded by its sales teams, but wishes to limit how often they are used or how much of the network or device's resources the applications are allowed to use at any particular time. Anything over a certain allotment will require an authorization code from an approving authority (e.g., the sales manager or his representative).

Various alternate embodiments are possible. For example, it is contemplated that the device 118 may be a new type of device with only up/down arrows and send keys, and no numeric keypad. In another example, preference settings may include routing blocked incoming calls to voicemail and routing unapproved outgoing calls to an approved authority before the call can go through. In still another example, similar preference settings may be established for data buckets or application downloads, or features may be set at a per application or function level.

In yet still another example, the JAMS 606 included in the device 118 may handle the automated management using the condition catalog 802 and the condition registry 804 populated with applications or programs that can invoke other applications, databases, counters, or references. Alternatively, the preference settings are stored in a memory or database and a downloaded application executes different subroutines or portions of its program as current conditions are received or calls are initiated to control the device behavior. In any case, management of the device behavior is typically not hardware-based for purposes of flexibility.

In this manner, a system and method for automated management of the behavior of a wireless communication device is disclosed herein. A variety of behavior preference settings are configured by an authorized person or party (e.g., a parent, supervisor, or corporate security) at the wireless communication device or remotely, and may be modified in real-time. The preference settings can be secured with a password or other security measures. The enforcement of the preference settings occurs at the wireless communication device, and not on the service provider equipment or by the service provider, thus placing little additional strain on the wireless network itself. The device enforces set preferences using counters, one or more databases or references, and notification of current conditions or events (e.g., start of off-peak rate time).

Thus, a flexible and inexpensive scheme for controlling costs or other aspects associated with usage of a wireless communication device is provided. One "cost" associated with the device, that is, the service subscription usage cost, becomes predictable by providing post-paid behaviors with pre-paid limitations and constraints. The wireless communication device is hence configured for its intended purpose or use only. Even if the device is lost, stolen, or used by a person other then the intended user, the restrictions prevent abuse of device usage.

Although not required, aspects of the invention have been described in the general context of computer-executable instructions, such as routines executed by a general purpose computer, e.g., a server, wireless device or personal computer. Those skilled in the relevant art will appreciate that the invention can be practiced with other communications, data processing or computer system configurations, including Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers and the like. Indeed, the term "computer", as used generally herein, refers to any of the above devices and systems, as well as any data processor. Aspects of the invention can be embodied in a special purpose computer or data processor that is specifically programmed, configured or constructed to perform one or more of the computer-executable instructions explained in detail herein. Aspects of the invention can also be practiced in distributed computing environments where tasks or modules are performed by remote processing devices, which are linked through a communications network. In a distributed computing environment, program modules may be located in both local and remote memory storage devices.

Aspects of the invention described herein may be stored or distributed on computer-readable media, including magnetic and optically readable and removable computer discs, as well as distributed electronically over the Internet or over other networks (including wireless networks). Those skilled in the relevant art will recognize that portions of the invention reside on a server computer, while corresponding portions reside on a client computer such as a mobile device. Data structures and transmission of data particular to aspects of the invention are also encompassed within the scope of the invention.

Unless the context clearly requires otherwise, throughout the description and the claims, the words "comprise," "comprising" and the like are to be construed in an inclusive sense as opposed to an exclusive or exhaustive sense; that is tot say, in a sense of "including, but not limited to." Words using the singular or plural number also include the plural or singular number, respectively. Additionally, the words "herein," "above," "below," and words of similar import, when used in this application, shall refer to this application as a whole and not to any particular portion of this application. When the claims use the word "or" in reference to a list of two or more items, that word covers all of the following interpretations of the word: any of the items in the list, all of the items in the list, and any combination of the items in the list.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize.

All of the above U.S. patents and applications and other references are incorporated herein by reference. Aspects of the invention can be modified, if necessary, to employ the systems, functions and concepts of the various references described above to provide yet further embodiments of the invention.

These and other changes can be made to the invention in light of the above detailed description. In general, in the following claims, the terms used should not be construed to limit the invention to the specific embodiments disclosed in the specification and the claims, but should be construed to include all networked digital messaging systems that operate under the claims. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. A method for automatically managing wireless device actions, the method comprising:
    associating at least one user preference with at least one wireless device, wherein the user preference is not based on a list of origination or termination address, or is not based solely on the list of origination or termination addresses;
    determining an occurrence of one or more conditions that relate to the user preference;
    at the wireless device, automatically prohibiting communications actions based on the occurrence of the condition; and
    controlling actions of the wireless device in accordance with the occurrence of the condition and prohibitions associated with the occurrence of the condition, including automatically executing at least one downloaded application and updating at least one counter, wherein:
        the at least one downloaded application internally controls the actions of the wireless device in accordance with the preference and without use of resources external to the wireless device other than the wireless device receiving at least one notification indicative of the condition.

2. The method of claim 1, wherein determining an occurrence includes sending an encoded short message service (SMS) message to the wireless device.

3. The method of claim 1, wherein associating at least one user preference includes an authorized person selecting the user preference using a graphical user interface remote from the wireless device and the provider network.

4. The method of claim 1, wherein the condition includes at least one of:
    a peak rate being current;
    an off-peak rate being current;
    a minute bucket being empty;
    the wireless device currently roaming for service;
    the wireless device currently on the network; and
    a start of a new billing cycle.

5. The method of claim 1, wherein the occurrence of the condition is indicated by a counter in the wireless device reaching a predetermined value.

6. The method of claim 1, further comprising:
    configuring macro level preferences associated with the amount of total usage of the wireless device;
    configuring the list of approved origination and termination addresses, the origination and termination addresses including outgoing and incoming phone numbers, email addresses, and HTTP addresses; and
    configuring micro level preferences associated with each of the addresses in the list of approved origination and termination addresses.

7. The method of claim 1, further comprising:
    updating a preferences database included in the provider network with the user preference;
    sending a message to the wireless device when the user preference is available; and
    downloading the user preference to the wireless device.

8. The method of claim 1, wherein the user preference includes at least one selected from the group of:
    a number of minutes allotted to outgoing calls;
    a number of minutes allotted to incoming calls;
    a number of outgoing messages allowed;
    a number of incoming messages allowed; and
    a rule relating to whether a bucket of minutes can be exceeded.

9. The method of claim 1, further comprising receiving the user preference at a website associated with a wireless service provider.

10. The method of claim 1, wherein automatically prohibiting communications include:
    initiating a communication over a provider network; and
    preventing connection of the communication when an amount of total usage of the wireless device has been reached.

11. The method of claim 1, wherein automatically prohibiting communications include:
    initiating a communication over a provider network;
    comparing an address associated with the communication with the list of approved origination and termination addresses; and
    preventing the communication when the address is not included in the list.

12. The method of claim 1, wherein automatically prohibiting communications include:
    initiating a communication over a provider network;
    comparing an address associated with the communication with the list of approved origination and termination addresses;
    accessing restrictions associated with the address when the address is included in the list; and
    preventing the communication when at least one of the accessed restrictions is applicable.

13. The method of claim 1, wherein automatically prohibiting communications include:
    initiating a communication over a provider network;
    comparing an address associated with the communication with the list of approved origination and termination addresses;
    accessing restrictions associated with the address when the address is included in the list;
    permitting connection of the communication when none of the accessed restrictions is applicable; and
    updating one or more counters at the wireless device.

14. The method of claim 1, further comprising automatically routing blocked calls to a voice mail service or automatically forwarding calls to be blocked for connection permission by an authorizing person.

15. The method of claim 1, wherein a person setting the preferences is not a user of the wireless device.

* * * * *